M. RUCKES.
COMBINED WEIGHING AND COUNTING MACHINE.
APPLICATION FILED OCT. 1, 1914.
1,161,009.
Patented Nov. 16, 1915.
3 SHEETS—SHEET 1.
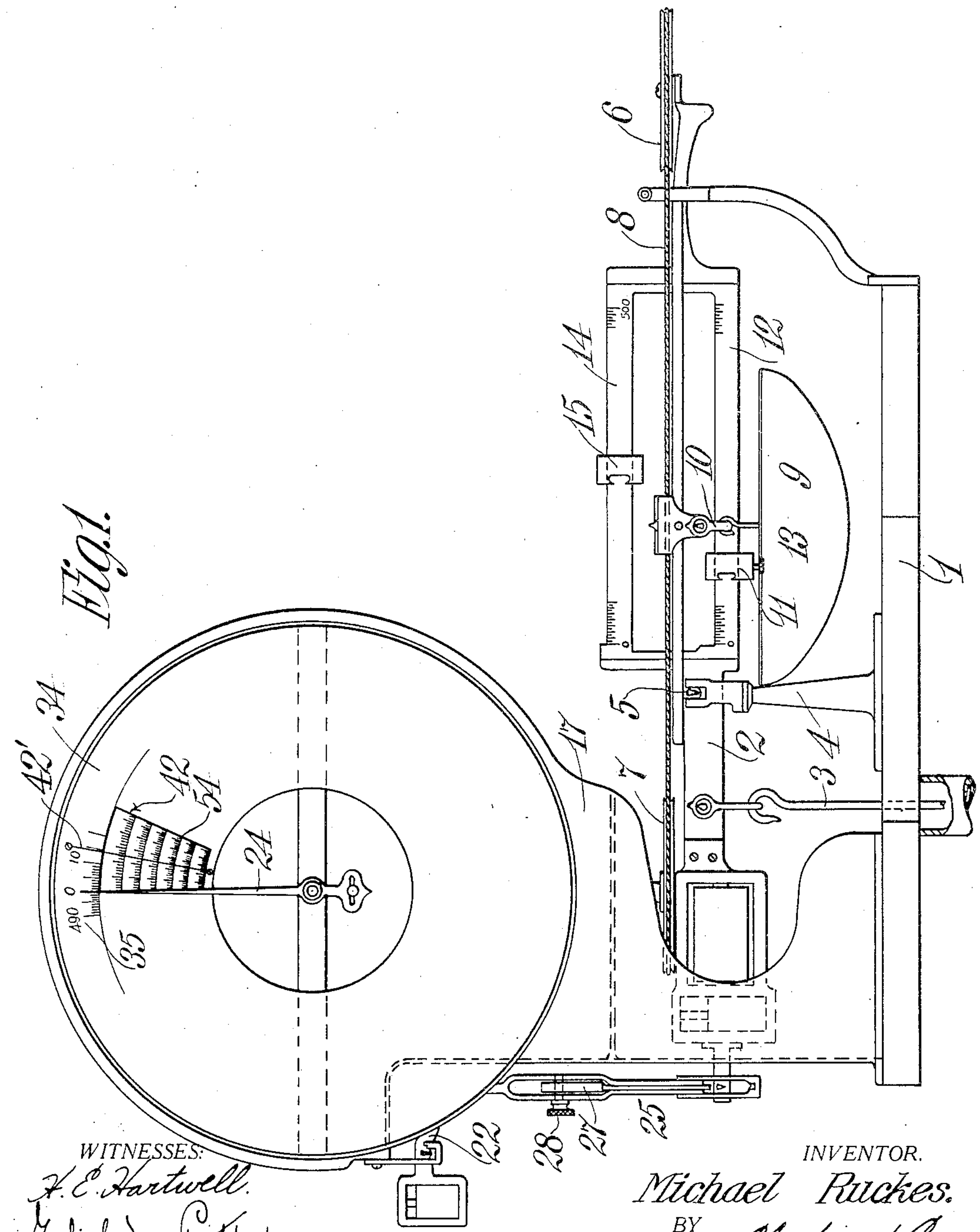
WITNESSES:
H. E. Hartwell.
Edith M. Potter
INVENTOR.
Michael Ruckes.
BY Chapin & Co.
ATTORNEYS M. RUCKES.
COMBINED WEIGHING AND COUNTING MACHINE.
APPLICATION FILED OCT. 1, 1914.
1,161,009.
Patented Nov. 16, 1915.
3 SHEETS—SHEET 2.
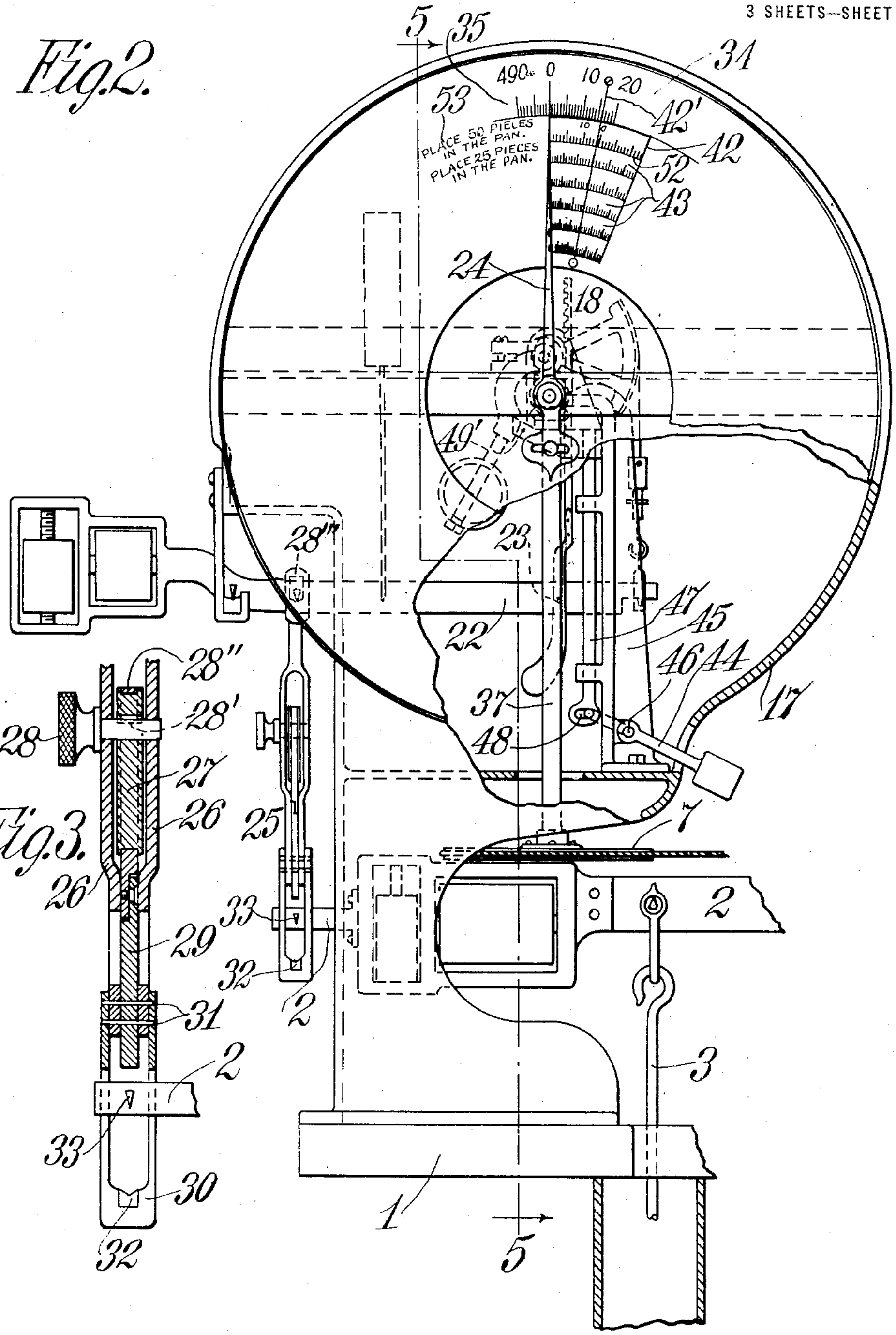
WITNESSES:
A. E. Hartwell.
Edith M. Potter
INVENTOR.
Michael Ruckes.
BY Chapin & Co.
ATTORNEYS M. RUCKES.
COMBINED WEIGHING AND COUNTING MACHINE.
APPLICATION FILED OCT. 1, 1914.
1,161,009.
Patented Nov. 16, 1915.
3 SHEETS—SHEET 3.
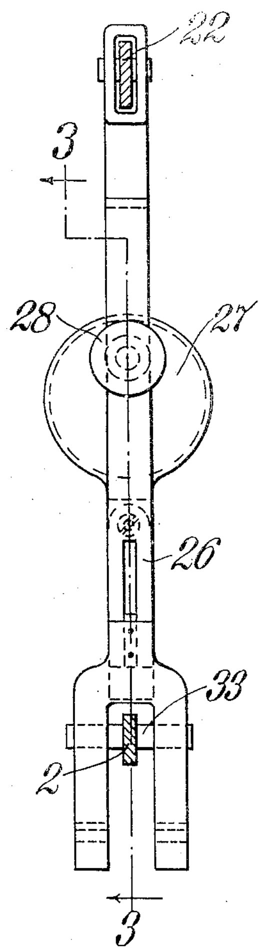
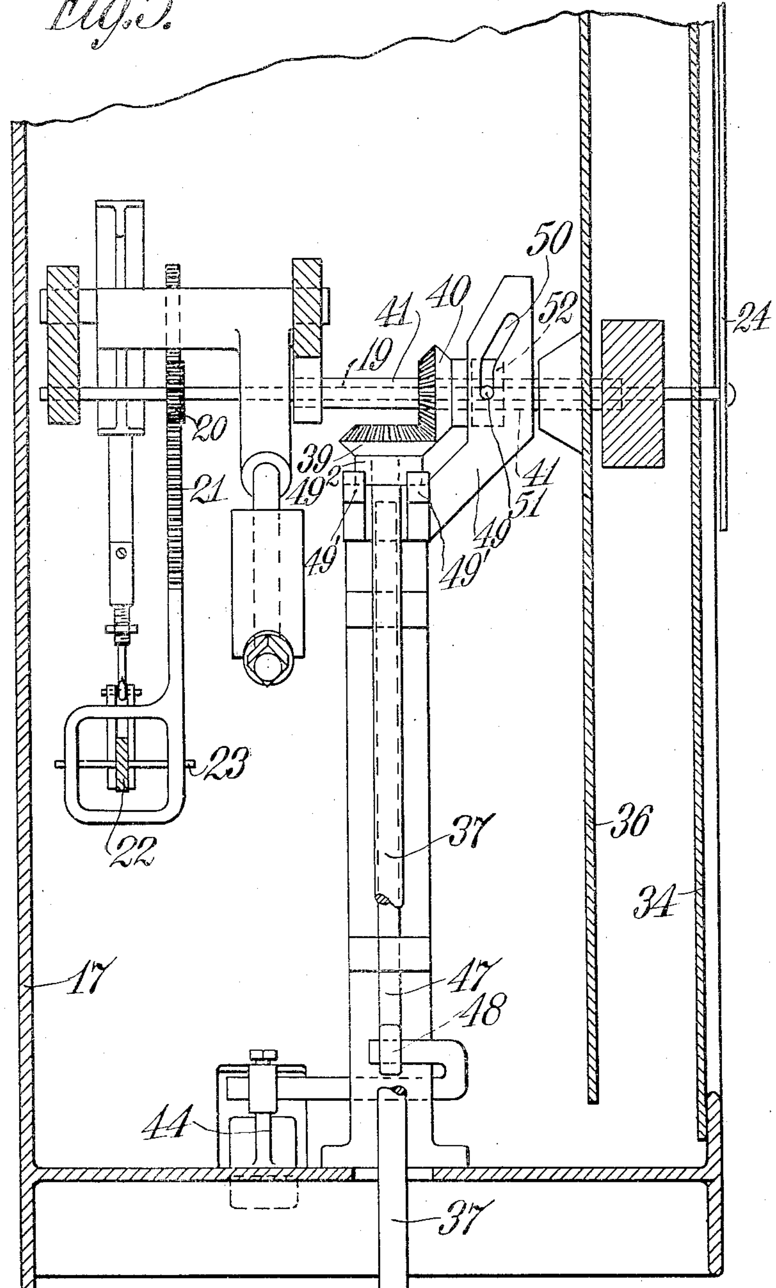
WITNESSES:
H. E. Hartwell.
Edith M. Potter
INVENTOR.
Michael Ruckes.
BY Chapin & Co.
ATTORNEYS

UNITED STATES PATENT OFFICE.

MICHAEL RUCKES, OF CHICOPEE FALLS, MASSACHUSETTS.

COMBINED WEIGHING AND COUNTING MACHINE.

1,161,009. Specification of Letters Patent. Patented Nov. 16, 1915.

Application filed October 1, 1914. Serial No. 864,401.

*To all whom it may concern:*

Be it known that I, MICHAEL RUCKES, a citizen of the United States of America, residing in Chicopee Falls, in the county of Hampden and State of Massachusetts, have invented certain new and useful Improvements in Combined Weighing and Counting Machines, of which the following is a specification.

This invention relates to improvements in combined weighing and counting machines.

An object of this invention is to provide means for quickly and accurately counting any commodity consisting of similar parts or pieces. It is often necessary to know how many articles there are in a barrel, box or barrow containing an unknown number.

The present invention is designed not only for counting the number of pieces but also for giving the weight automatically.

A further object of the invention is to enable the operator to determine at a glance from suitable dials and pointer and dial operating mechanisms either the weight or the number of the articles, as desired.

A further object of the invention is to provide means for quickly rendering the weight indicating, pointer operating mechanism, operative or inoperative when it is desired.

Referring to the drawings forming a part of the specification Figure 1 is a general view of the improvement showing the arrangement of the dials with relation to the beam and the connecting means therebetween for operating the pointer and movable dial from the beam. Fig. 2 is a view showing the connection between the rear end of the beam and the pointer operating mechanism; also the means for rotating one of the dials from the means for moving the pan. Fig. 3 is a detail sectional view on the line 3—3 of Fig. 4 of the eccentric mechanism for connecting and disconnecting the beam and the pointer operating mechanism. Fig. 4 is a side elevational view of the connecting means clearly showing the eccentric construction and the knob for operating the eccentric. Fig. 5 is a detail vertical sectional view on the broken line 5—5 of Fig. 2 showing the casing for inclosing the connecting means between the beam and the movable pointer and the means for rotating the dial from the movable pan in which duplicates of the articles on the platform to be counted are placed.

Referring to the drawings in detail, 1 designates the shelf which serves as a base for the weighing beam and casing for pointer and dial operating mechanism.

2 is the usual weighing beam to which is connected the usual draft rod 3 that extends to the usual levers under the platform, not shown. The beam 2 is pivotally supported on the post 4 by means of the knife edge 5. The forward and rear ends of the beam 2 are each provided with a sheave wheel 6 and 7 respectively that are pivotally mounted on this beam, around which passes the flexible cord 8 to which the movable pan 9 is connected as shown at 10.

11 and 15 are poise weights which move along the lower and upper limbs 12 and 14 respectively of the weighing beam.

The parts just referred to do not form any part of the present invention as they are of the usual counting and weighing scale construction.

Referring now to the parts forming my particular improvements, 17 designates a casing that is suitably secured to the shelf 1 of the scale. Within this casing is located the usual weight indicating pointer operating mechanism indicated as a whole by the numeral 18, see Fig. 2. The shaft 19 carries a pinion 20 which engages the teeth of a rack 21 that is pivotally attached to the short beam 22 by means of the pin 23. The beam 22 operates the usual pendulum construction 18 which moves the weight indicating pointer 24. Extending between the beams 2 and 22 is a link connection 25 having an eccentric device for varying its length and comprising a pair of spaced members 26 within which is located the eccentric disk 27. 28 designates a knob that is secured to this disk by means of the key 28′ and is free to turn in the members 26.

28″ is a strap that surrounds the disk 27 to the lower end of which is connected the rod 29, which in turn is connected to yoke 30 by means of the pins 31. This yoke carries at its lower end the bearing 32 against which the knife edge 33 of the beam 2 bears when the knob 28 is rotated to turn the eccentric in order to shorten the connection which raises the rod 29 and the yoke 30 into engagement with the knife edge 33 of the beam 2. The upper end 28''' of the members 26 normally rests as shown in Fig. 2 upon the knife edge in the beam 22. It will be seen from this connection between the beams 2 and 22 that provision is made, by simply turning the eccentric disk 27 by means of the knob 28 for readily connecting and disconnecting the beams 2 and 22 to and from each other. When the link 25 connects the two beams, the shaft 19 which is connected with the weight indicating pointer 24 operates in unison with beam 2 and is rotated by the weight placed on the platform of the machine. The pointer 24 sweeps over a fixed dial 34 on which is placed figures 35 that represent weight, as grams or ounces.

In order to indicate on the dial the number of pieces on the platform, means are provided to rotate the disk 36 from the sheave wheel 7 when the cord 8 is moved to slide the pan 9, containing a specified number of articles, which are duplicates of those on the platform, along the beam 2. This means comprises a shaft 37 that is rigidly secured to the sheave wheel 7 that is rotatably secured to the beam 2 and carrying a bevel gear 39 at its upper end which is out of mesh with the bevel gear 40 when the beam 2 is in balanced condition.

41 designates a sleeve that is secured to the bevel gear 40 and to the other end of which the rotatable counting disk 36 is secured, whereby, when the sheave wheel 7 is rotated, the counting disk 36 will also be turned through the correct angle.

42 is an opening in the fixed weighing disk 34, through which the observer can read the graduation representing the count of pieces on the platform as it passes the hair line 42' that is secured to the fixed dial 34.

The different circles of graduation are for indicating the number or count of pieces on the platform when different numbers of pieces are placed in the ratio pan 9. The counting graduation on each circle is laid out for a definite number of pieces in the ratio pan 9.

For the purpose of engaging the bevel 39 with the gear 40 and rendering the count indicating disk operative, a trigger is provided which consists of a weighted lever 44 that is pivoted to the standard 45 at 46. The inner end of the lever 44 is connected to a rod 47 by means of the loose pin and slot connection 48. Connected to the upper end of the rod 47 is a block 49 formed with an angular slot 50 therein.

51 designates a pin secured to the collar 52 on the hub of the gear 40 and located in the slot 50, whereby, when the lever 44 is lowered, the rod 47 will raise the block 49 and cause the pin 51 to travel to the lower end of the angular-shaped slot 50 and move the gear 40 in mesh with the gear 39. When the gears 39 and 40 are disengaged, the beam 2 is free to balance.

The block 49, it will be noticed, is formed with two projections 49' that are designed to engage the underside of the hub $49^2$ of the gear 39, in order to slightly lift the gear 39 and hold it up in mesh with the gear 40 when the lever 44 assumes the position shown in Fig. 2. When the lever 44 is elevated, the rod 47 is lowered causing the projections 49' to be moved away from the underside of the hub $49^2$ and the gear 39 out of mesh, or nearly so, with the gear 40. This is necessary for it will be seen that, when the operator is obtaining a balance of the beam 2, the gear 39, being supported on the beam 2, must rise and fall slightly. The method pursued by the operator in obtaining a balance of the beam 2 and, at the same time, causing the disk 36 to rotate to the correct angular position relative to the cross-wire 42' is as follows. A desired number of pieces of the articles to be counted are placed in the ratio-pan 9, say 25; next, the articles to be counted are placed on the platform (it being understood that the articles in the pan and on the platform are duplicates). The operator then moves the pan 9 along the beam 2 by means of the cord 8. This operation will rotate the shaft 37, gear 39, gear 40, and counter disk 36. The operator now lifts the lever 44 to disengage the gears 39 and 40 in order to see if the beam 2 is in balance by observing its outer end adjacent the sheave wheel 6. If the beam is not in balance, the lever 44 is allowed to assume the position shown in Fig. 2 bringing the gears 39 and 40 into mesh again. The operator now moves the cord 8 again thus rotating the counter disk 36 into a new position. The lever 44 is again raised, as before, in order to determine if the beam 2 is in a balanced position. If it is, the lever 44 is lowered thus bringing the gears 39 and 40 into mesh and retaining the counter disk 36 in a stationary position. The operator can now directly read from the disk 36 through the opening 42, aided by the cross-wire 42', the number of pieces on the platform of the machine to which the rod 3 is connected. The total weight of the number of pieces on the platform is determined by means of the pointer 24 from the scale 35 after removing the articles from the pan 9. The ratio-pan 9 does not effect the balance of the beam when the pan is moved along the same by means of the cord 8 since a poise (not shown) of equal weight to the pan 9 is connected to the opposite strand of the cord 8. This usual construction is clearly shown in the patent to Sanderson No. 659,830, October 16, 1900 (see Fig. 3).

In order to clearly understand the operation of the counting features of my machine, it may be stated that, if it is desired to count a definite number of pieces, say 10,000 duplicate pieces, 50 of the articles may be placed in the ratio pan 9. The pan 9 is then moved until the graduations on the circle on the revoluble disk 36 calling for fifty pieces in the pan stands at 10,000 then, when articles are placed on the platform (not shown) of the machine, until the scale is in a balanced condition, there will be 10,000 pieces on the platform.

By means of the present invention, it will be seen that with the two dial arrangement the observer need only confine his attention to the pointer 24 and the count indicating cross-wire 42′ in order to determine either the weight of or number of articles in a lot of pieces. It will be seen that it is possible by means of the connecting link to render the pointer operating mechanism inoperative by disengaging it from the beam 2, then the beam 2 will be free to show the true weight of the articles on the platform by sliding the poise weight in the usual manner. When the pointer operating mechanism is engaged with the beam, any weight balanced by sliding the poise weights along the beam will be deducted in the weight shown on the dial from the weight of articles on the platform; thus, the beam 2 will serve to automatically deduct for tare.

It is to be understood that the term "platform" may include a pan or any other suitable means or receptacle to receive the articles to be weighed or counted. Also, it is to be understood that I do not intend to limit myself to the precise arrangement of parts as obvious changes may be made without departing from the spirit and scope of my invention.

What I claim is—

1. The combination in a weighing and counting machine, a pair of beams adapted for connection to a suitable platform upon which the goods to be weighed are placed, a poise slidable along one of said beams to indicate the weight, means to operatively connect and disconnect said beams to or from each other, a fixed dial bearing figures and representing weight on the face thereof, a pointer movable over said dial, pendulum counterpoising means connected to said pointer and connecting means from one of the beams to said counterpoising means, a movable dial bearing figures and representing the number of articles to be counted, a pan supported on one of the beams to receive a definite number of duplicates of the articles which are placed on the platform, connecting means between the pan and the movable dial, whereby, when the pan is moved on its supporting beam, the number of pieces on said platform will be indicated on the dial.

2. In a weighing and counting machine, a beam adapted for connection to a suitable platform or article receiving receptacle, of a stationary and a rotatable dial having numbers on each, a weight-indicating pointer, a movable counter-poise and connections therefrom to the pointer, the fixed dial having an opening therethrough and over which is placed a cross-wire, means operable from the beam to move said pointer relative to the fixed dial to indicate weight, means for rendering said pointer inoperative, means carried by the beam and operable therefrom for rotating the movable dial relative to the fixed cross-wire over the opening in the fixed dial for counting the number of articles on the platform, said last-named means comprising a ratio pan, connecting means from the pan to the rotatable dial, and means for disconnecting the rotatable dial from the connecting means to allow the beam to assume a balanced position, as described.

3. In a combined weighing and counting machine, two beams, adapted for connection to a suitable platform to receive the articles to be counted and weighed, extensible means to connect or disconnect the beams together for operating one beam from the other and comprising an eccentric for moving one part of the connecting means relative to the other for varying the length of said means, a weighing and a counting dial located one back of the other, a weight indicating pointer operable from one of the beams when the connecting means is contracted for connecting the two beams and movable relative to the weight dial, a movable counter-poise and connections therefrom to the pointer, a ratio pan for receiving a definite number of the articles to be counted, connecting means between the ratio pan and the counting dial for operating the same and numbers thereon for counting the number of articles on the platform, said numbers being visible through an opening in the weighing dial, whereby both the weight and number of the articles on the platform may be determined from the position of the pointer relative to the fixed dial and from the numbers on the counting dial through the opening in the fixed dial.

4. In a weighing and counting machine the combination, of a beam adapted for connection to a platform, a weight indicating dial having an opening therein, a revoluble counting dial having numbers thereon and visible through said opening for determining the number of the articles to be counted, a ratio pan movably supported on the beam on which the articles to be counted are placed, means for operating the counting dial from the pan, means for rendering said dial inoperative during the balancing operation of the beam, said means comprising a sleeve to which the dial is connected, a bevel gear on the sleeve, a second bevel gear, means to disengage the gears during the balancing operations and for moving the first gear in mesh with the second gear, as described.

5. In a weighing and counting machine the combination, of a beam, adapted for connection to a suitable platform to receive the articles to be counted or weighed, a revoluble counting dial means to operate the counting dial from the beam and having numbers thereon for determining the number of articles on the platform, an article receiving ratio pan movably supported on the beam for initially placing the dial in a position to indicate a definite number of articles to be counted, means for operating the dial from the pan, means for rendering the dial inoperative, said means comprising a sleeve to which the dial is connected, a bevel gear on the sleeve, a second bevel gear normally meshing with said gear, a trigger or releasing device for moving the first gear out of mesh with the second gear, a fixed weight indicating dial formed with an opening therein, said revoluble dial being readable through the opening in the other dial, as described.

6. A combined weighing and counting machine, comprising a weighing and a counting dial, two beams adapted for connection to a suitable article receiving platform, means to operatively connect the beams together, a weight indicating pointer operable in unison with the beams when said beams are connected together, a movable counter poise for said pointer, an article receiving ratio pan movably supported on one of the beams, connecting means from the ratio pan to the counting dial to rotate said dial from the movements of the pan to indicate the number of articles to be counted, and connecting means from the other beam to operate the pointer for determining the weight of the articles on the platform.

7. In a weighing and counting machine, the combination, of a beam, and adapted for connection to an article receiving platform, a ratio pan movably supported on said beam, a weight indicating and a number indicating dial arranged one back of the other, the weight-dial being fixed and provided with an opening therethrough for rendering the counting dial visible, a connection between the ratio pan and the number indicating dial, said number indicating dial being movable from the ratio pan, a weight-indicating pointer operable from said beam and movable over the weight dial, a counter poise for said pointer, and means to connect the pointer to the counterpoise, the platform serving to receive duplicate articles of those in the ratio pan to be weighed and counted are placed.

8. In a weighing and counting machine, the combination, of a beam, a ratio pan movably supported on said beam, a weight indicating and a number indicating dial arranged adjacent the other, the weight dial being fixed and provided with an opening therethrough for rendering the counting dial visible, a connection between the ratio pan and the number indicating dial, said counting dial being movable from the ratio pan, a weight indicating pointer operable from said beam and movable over the weight dial, a counter-poise connected to the pointer, a connection from the beam to a suitable platform on which the articles, duplicates of those in the ratio pan, to be weighed and counted are placed, whereby the weight and count of the articles may be determined from an inspection of both dials, and means for disconnecting the weight indicating pointer in order to indicate the number of the articles without determining their weight.

MICHAEL RUCKES.

Witnesses:
HARRY W. BOWEN,
H. E. HARTWELL.